March 29, 1960     F. C. JONAH     2,930,288

TANDEM ROCKET LAUNCHER AND FIRING SYSTEM

Filed May 9, 1955     5 Sheets-Sheet 1

INVENTOR.
FREDERICK C. JONAH

BY
*ATTORNEYS*

March 29, 1960   F. C. JONAH   2,930,288
TANDEM ROCKET LAUNCHER AND FIRING SYSTEM
Filed May 9, 1955   5 Sheets-Sheet 2

INVENTOR.
FREDERICK C. JONAH
BY
ATTORNEYS

March 29, 1960     F. C. JONAH     2,930,288
TANDEM ROCKET LAUNCHER AND FIRING SYSTEM
Filed May 9, 1955

INVENTOR.
FREDERICK C. JONAH

March 29, 1960 F. C. JONAH 2,930,288
TANDEM ROCKET LAUNCHER AND FIRING SYSTEM
Filed May 9, 1955 5 Sheets-Sheet 4

INVENTOR.
FREDERICK C. JONAH
ATTORNEYS

INVENTOR.
FREDERICK C. JONAH

United States Patent Office 2,930,288
Patented Mar. 29, 1960

2,930,288

TANDEM ROCKET LAUNCHER AND FIRING SYSTEM

Frederick C. Jonah, Dallas, Tex., assignor to Chance Vought Aircraft, Incorporated, Dallas, Tex., a corporation of Delaware Application May 9, 1955, Serial No. 507,017

8 Claims. (Cl. 89—1.7)

This invention relates to rocket launching devices and more particularly to a rocket pack capable of being attached to an aircraft and of firing rockets in tandem.

The design of aircraft rocket launching devices depends to some extent on the aircraft design, the desired flight characteristics of the aircraft and the number of rockets to be accommodated. Heretofore, launchers capable of carrying large numbers of rockets utilized magazines housed within the aircraft, which construction was usually incapable of being adapted to existing aircraft, occupied a large space within the fuselage, and permitted a limited rate of fire. In addition, such launchers were complicated and heavier in construction which is a critical factor in present day aircraft design.

It has been found that a properly faired rocket pack shell on an outer surface of the aircraft imposes very small penalties in aircraft range, speed, and maneuverability while providing a maximum rocket load.

According to the present invention a multiple rocket launcher is provided that will house and fire rockets in tandem, one after another. In one embodiment the launcher is constructed with one or more pairs of laterally spaced rocket tubes disposed in tandem, an aft tube in each pair being axially aligned and spaced from a forward tube through which an aft rocket is propelled after ignition of a forward rocket. To permit the ignition of the forward rocket and still have a free tube for passage of the aft rocket, the forward firing mechanism is retractable from the firing position in the space between the aligned tubes, and, in the preferred form, the firing mechanism is mounted on a pivotable deflector door which functions to protect the aft rocket from the forward rocket blast. In another embodiment the rockets in tandem are supported in a single firing tube. In each modification safety measures are provided for ensuring against the firing of an aft rocket until the corresponding forward rocket is fired. Each rocket tube is furnished with a latch mechanism for retaining the rocket within the tube and preventing accidental displacement until a predetermined rocket thrust is developed. The rocket tubes are housed in a faired shell that is mounted to the underside of the airplane, the shell being quickly attached and detached by a manually operated latching mechanism. An exit opening is formed in the forward end of the shell through which the rockets are ejected, the opening having a door and an associated switch in the firing circuit to disarm the latter when the door is closed. Other safety precautions are provided in the firing circuit to assure safe operation of the rocket pack while the aircraft is in flight or grounded.

A principal object of the invention is to provide a rocket pack capable of accommodating a greater rocket load and to attain a high rate of fire without imposing aerodynamic penalties on the supporting aircraft.

Another object is to provide a rocket pack in which a maximum load can be carried in a faired shell having rocket tubes arranged in a single or multiple layer formation.

A further object is to provide a firing circuit for such a rocket pack operable remotely by an operator to launch preselected groups of rockets in tandem and including precautions to ensure safe operation.

Still other objects are to provide a rocket pack which is capable of being adapted to existing aircraft without excessive modification, and which can be quickly attached and detached from the aircraft for replacement and maintenance.

Other objects and many of the attendant advantages of this invention will be readily appreciated as the same becomes better understood by reference to the following detailed description when considered in connection with the accompanying drawings wherein.

Figure 1:
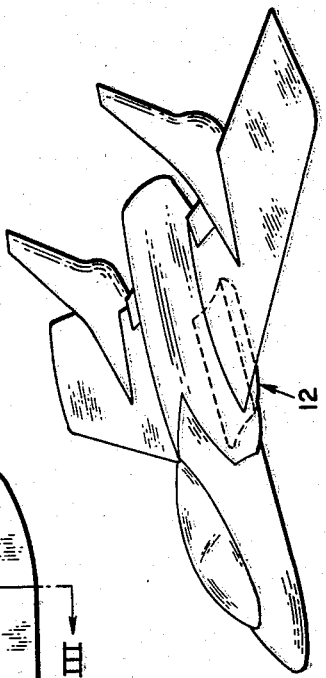
Fig. 1 is a top perspective view of an airplane carrying the rocket pack of this invention on the underside of the fuselage.

Referring now to the drawings, wherein like reference characters designate like or corresponding parts throughout the several views, there is shown generally in Fig. 1 a rocket pack 12 particularly suited for attachment to an under section of the fuselage of a F7U-3 airplane, and having a remotely controlled system for electrically firing 2.75 inch folding-fin air-to-air rockets, although it is to be understood that the invention is not necessarily limited to the particular aircraft or to the size or type of rocket.

Figure 2:
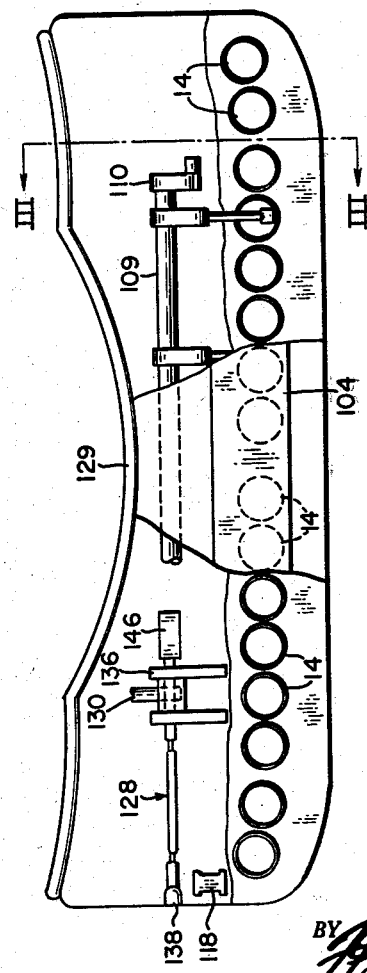
Fig. 2 is a front view of the rocket pack partially in section to show the lateral disposition of the rocket tubes and other details.
Figure 3:
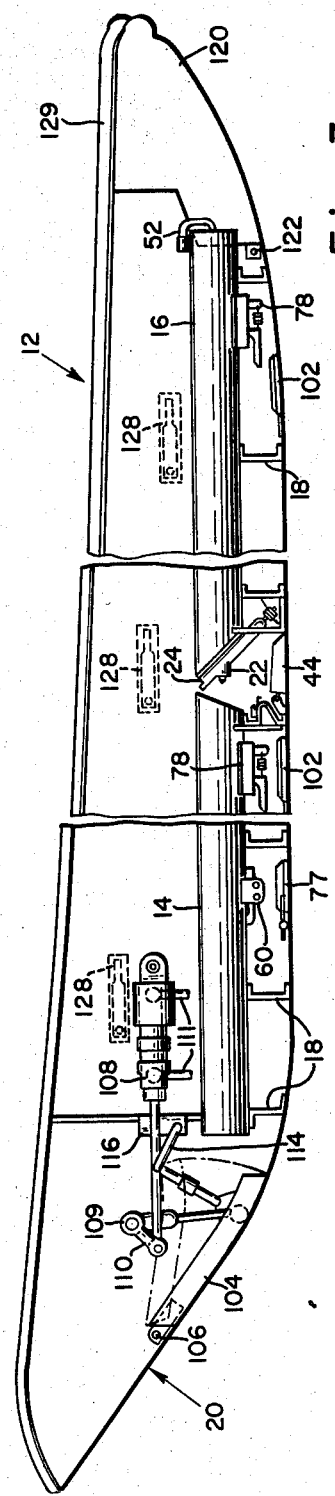
Fig. 3 is a longitudinal section of the rocket pack taken along line III—III of Fig. 2 showing the tandem arrangement of the rocket tubes, and disposition of the various component devices.

As illustrated in Figs. 2 and 3, rocket pack 12 comprises a plurality of pairs of forward and aft rocket tubes, each pair beign laterally disposed and comprising tubes 14 and 16 longitudinally aligned in tandem in spaced relation, each tube adapted to carry a rocket. The particular rocket pack shown in Figs. 2 and 3 is constructed to carry thirty-two acceleration armed rockets in two banks, sixteen forward and sixteen aft, although it is obvious that the total number and disposition of the rocket tubes may vary depending on the aerodynamic requirements of any given aircraft. The rockets may be launched in a salvo or portions thereof in a manner later to be described. The rocket tubes are generally mounted at each end by frames 18 within a shell 20 faired to the contour of the lower fuselage, the shell being readily detachable by a latching mechanism later to be described. Each rocket tube 14 and 16 is open ended and functions as a firing chamber for the respective rocket, and in addition forward tube 14 being in the path of the aft rocket serves as a guide therefor to improve flight characteristics of the latter.

Figure 4:
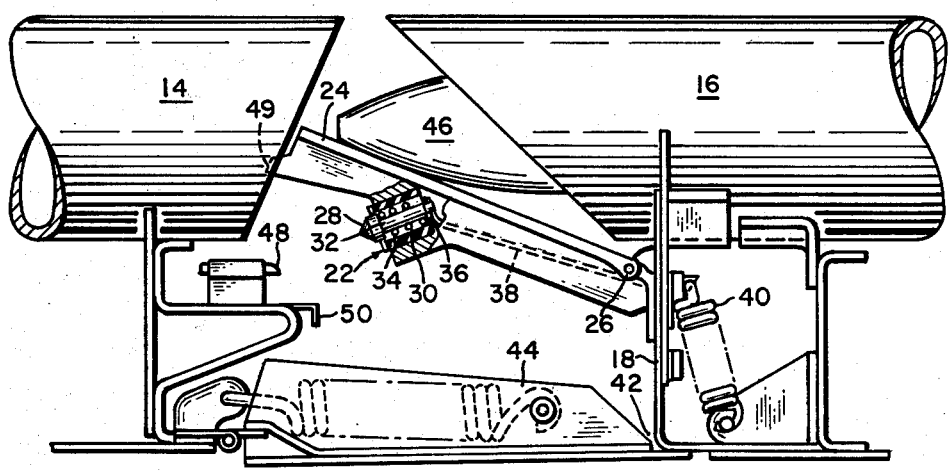
Fig. 4 is an enlarged view, partially in section, of a pair of fore and aft rocket tubes showing details of the deflector door and integral forward rocket firing mechanism, the door in the midst of being opened by the passage of an aft rocket.

As the rocket tubes in each bank are identical, the following description of a typical pair of forward and aft rocket tubes 14 and 16 will apply to all laterally disposed pairs. It is apparent that three or more banks of rocket tubes could be arranged in tandem if an additional rocket load is desired and the rocket size and the space available will permit. In order to fire rockets in tandem, it is necessary to clear the forward tube and intermediate space between fore and aft tubes of any firing mechanism and other structure that will interfere with passage of the aft rocket body and fins. This is accomplished in the instant invention by arranging the firing mechanism to be movable in and out of this space, and as shown in Figs. 3 and 4 a forward rocket tube firing mechanism 22 is mounted on the forward face of a deflector door 24 pivoted at 26 to frame 18. Firing mechanism 22 comprises a conical shaped firing pin 28 slidably mounted in an insulator housing 30, the pin having a reduced shank 32 around which is positioned a compression spring 34 normally urging the pin outwardly to engage the forward rocket primer, not shown, the outward movement of the pin being limited by a washer 36 upon engagement with the insulator housing. The inward movement of pin 28 is limited by the solid height of the spring to prevent the conical surface of the pin from entering the housing and forming a pocket that would accumulate residue formed during firing and jam the pin. A conductor 38 connects the firing pin to the firing circuit, hereinafter described, and extends through a longitudinal opening in the deflector door for protection against the heat of the blast.

The adjacent edges of the forward and aft rocket tubes are cut on a bias to conform to the pivotal action of the deflector door which is urged snugly against aft tube 16 by a closing spring 40 to protect the rear rocket from the forward rocket blast. In a closed position, deflector 24 aligns firing pin 28 with the forward rocket primer and upon ignition of the forward rocket deflects the blast downwardly and out through an exhaust opening 42 in the shell, which may be provided with a door 44 spring urged to a closed position and opened by the force of the blast. As is shown in Fig. 4, deflector door 24 is in the midst of being forced open by the nose of an ignited rear rocket 46 and will be retained in an open horizontal position to prevent interference with the passage of the rocket body and fin assembly by a latch 48 designed to engage a door latch tongue 49. A latch release 50 accessible through exhaust opening 42 enables the deflector door to be returned to the firing position prior to reloading of the pack.

Figures 5, 8:
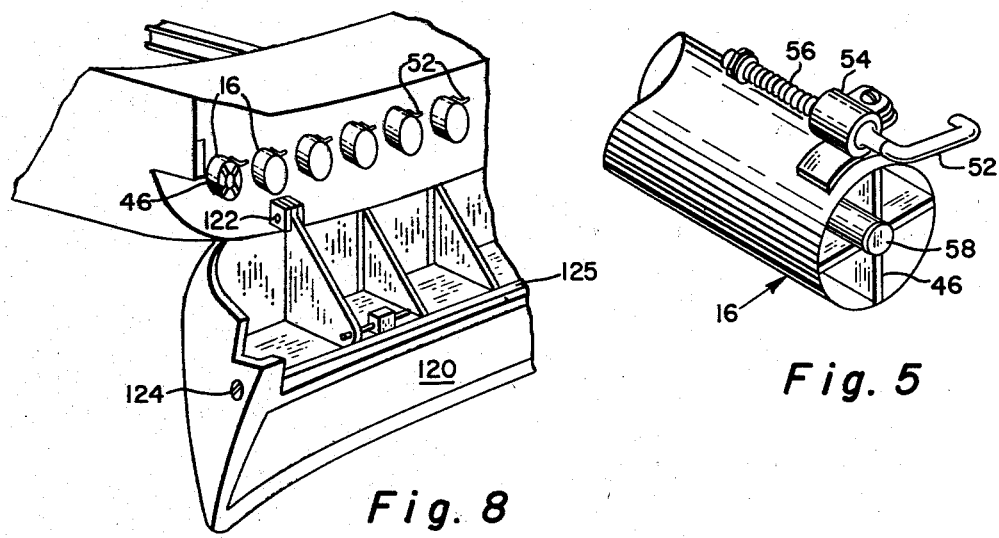
Fig. 5 is a rear perspective view of an aft firing tube and the associated firing mechanism.
Fig. 8 is a partial rear perspective view of the aft faired section in an open position.

A typical firing mechanism for the aft rocket tubes is shown in Fig. 5 and comprises a U-shaped firing pin 52, one leg being rotatably mounted and longitudinally reciprocable in a bracket 54 mounted on the rocket tube so that the pin can be offset from the tube axis for reloading rockets from the aft end. A compression spring 56 normally urges the firing pin into contact with the aft rocket primer 58. Cooperating means are provided on the pin and bracket to limit the movement of the firing pin to the firing and loading positions.

Figure 6:
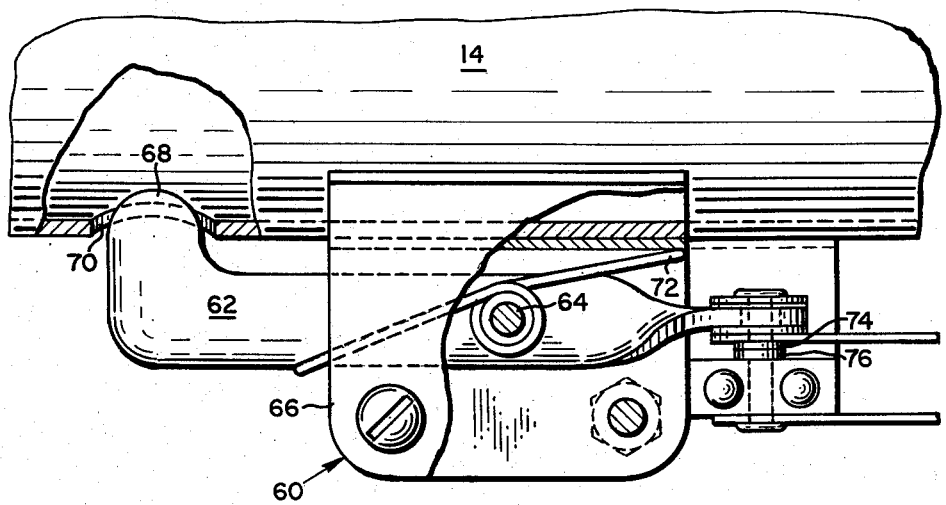
Fig. 6 is an enlarged view of a sensing switch, partially in section, mounted on each of the forward rocket tubes.

In a tandem rocket arrangement having both forward and aft firing mechanisms, some safety provision is desired to prevent the firing of an aft rocket while the corresponding forward rocket is still in the tube because of misfiring or any other malfunctioning. In the present invention, such a result is accomplished by a sensing or interlock switch 60, as shown in Figs. 3 and 6, which need only be installed on forward tubes 14. Switch 60 comprises an arm 62 intermediately pivoted at 64 to a U-shaped bracket 66 welded or otherwise attached to the forward rocket tube 14, preferably to the under portions of the tube which is most accessible from outside the pack. One end of arm 62 is provided with a trigger 68 adapted to project through a rocket tube opening 70 as urged by spring 72, the other end of arm 62 being provided with a contact 74 adapted to engage a fixed contact 76 in the absence of a rocket in the forward tube to complete the circuit to the aft firing mechanism and permit firing of the aft rocket, later described with reference to Fig. 10. Normally, depression of trigger 68 by a rocket in the forward tube opens the sensing switch to disarm and ground the aft firing circuit. A door 77 on the bottom of shell 20 provides access to the sensing switch.

Figure 7:
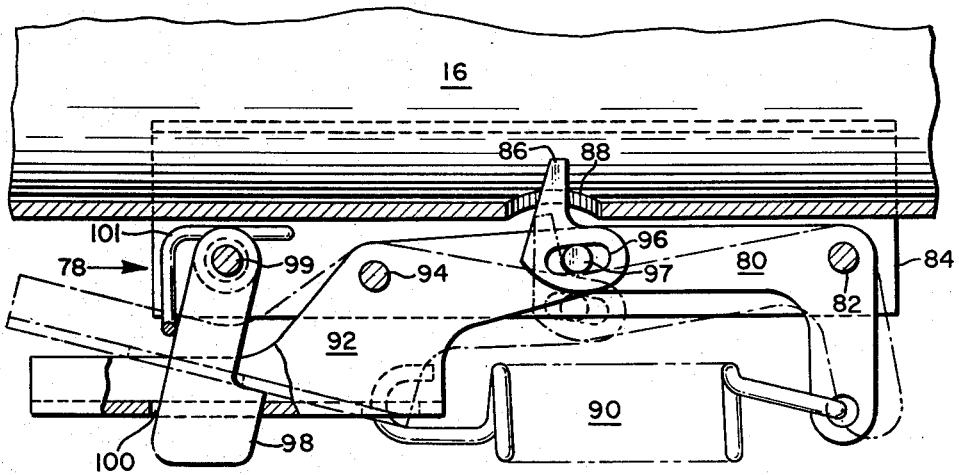
Fig. 7 is an enlarged longitudinal section of a rocket retaining latch mechanism mounted on each rocket tube and illustrated in latched and released positions.

A rocket retaining latch mechanism 78 is mounted on all of the forward and aft rocket tubes, as shown in Figs. 3 and 7, and restrains each rocket in its tube in firing position, preventing accidental displacement as might occur in carrier based aircraft during catapult launching, arrested landings, and emergency landings such as barrier crashes. Each latch mechanism 78 comprises a latch arm 80 intermediately pivoted at 82 to a pair of brackets 84 which are welded or otherwise attached to each side preferably to the under portion of the rocket tube as is sensing switch 60. It should be noted that one of the brackets 84 has been removed to show the latch details. One end of arm 80 is provided with a latch finger 86 capable of protruding through a rocket tube opening 88 and into the tube bore to engage a corresponding rocket recess, not shown, to retain the rocket in position. The other end of arm 80 is connected to a coil spring 90 for resisting any rocket-releasing movement of the latch finger until a predetermined rocket thrust is developed and exerted on latch finger 86. It has been found for 2.75 inch, folding-fin air-to-air rockets that a suitable latch-releasing force is 215 (±35) pounds. To prevent the released latch from interfering with the fin assembly of the respective rocket during egress, or an aft rocket in the case of a forward tube latch mechanism, there is provided a locking arm 92, U-shaped in cross section, and pivoted at 94 to brackets 84 and having an elongated slot 96 at one end to slidably engage a pin 97 secured to the finger end of arm 80. A hook 98 is pivoted at 99 to bracket 84 and extends through an opening 100 in the base of arm 92, hook 98 being urged to hook under arm 92 by a spring 101 to lock the latch mechanism in a released position, shown in broken lines, when latch arm 80 is tripped by the rocket thrust. The other end of retaining spring 90 is anchored to locking arm 92 and urges the latch to the rocket-engaging position, solid-line position, when hook 98 is manually disengaged. A door 102 is provided in the bottom of shell 20 for access to the latch mechanism.

Figure 9:
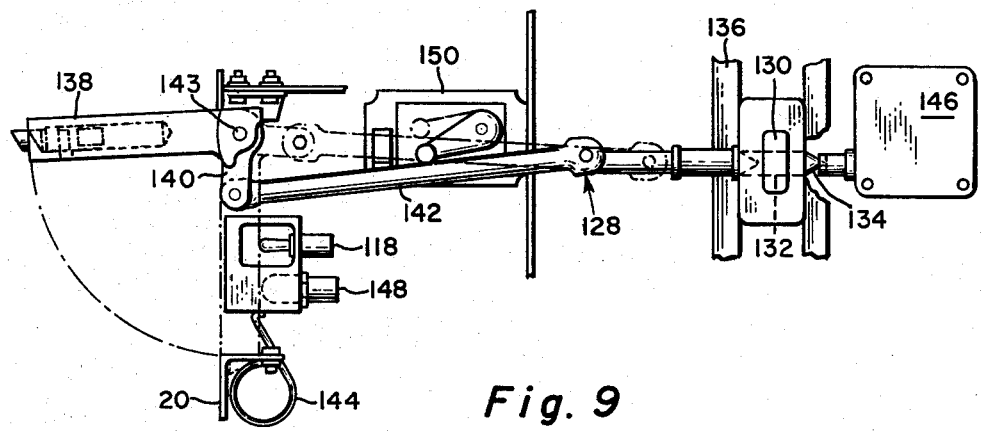
Fig. 9 is a top plan view of the left-hand locking handle and associated linkage and switches.

A forward exit door 104, Figs. 2 and 3, forms a portion of the rocket pack forward fairing and serves as a rocket tube protective cover when the rocket system is not in operation. Door 104 is hinged at 106 being actuated to an open position, indicated by broken lines, by a hydraulic cylinder 108, one at each side of the pack, through a shaft 109 and suitable crank-arm linkage 110. Flow to cylinder 108 through pipes 111 to open and close exit door 104 is controlled by an exit door selector valve 112 and associated switch 113 automatically positioned to an open position when the pilot fires the rockets, as will be described with reference to Fig. 10. An articulated linkage 114 is connected at one end to the door and at the other end to an exit door safety switch 116 connected in the firing circuit to prevent firing of rockets until the exit door is in the fully open position, that is, the trailing edge of the door rotated counterclockwise above the top surface of the rocket tubes. Exit door 104 further provides access for loading or unloading the forward rockets, for which purpose the exit door may be controlled from the ground by a manually controlled switch 118 (Fig. 9).

As shown in Fig. 8, aft rocket tubes 16 are loaded and unloaded through an aft fairing section 120 hinged at 122 and locked in closed position by an actuation knob 124 and associated latch linkage 125. Suitable exhaust openings may be provided in section 120 to vent the pressure and gases from aft rocket firings and may be provided with closures.

Another feature of the invention resides in the manner of mounting faired shell 20 to the underside of the fuselage to permit quick mounting and detachment, which comprises a plurality of manual, independently operated latching mechanisms 128 located at spaced locations around the shell as shown in Fig. 3. The edge of shell 20 is provided with a resilient sealing tube 129 adapted to engage the fuselage to seal the connection and absorb any vibration occurring therebetween. The left-hand mechanism shown in Figs. 2 and 9 is illustrative, of the various latch mechanisms 128 and, in addition, functions as a master control, constituting an interlock in the firing circuit to prevent accidental firing while the airplane is grounded. Each latch mechanism comprises a downwardly extending fitting 130 anchored in the airplane fuselage and having a transverse opening 132 in the free end adapted to receive a latch pin 134 for locking the fitting to a shell support 136. Latch pin 134 is actuated by locking handle 138, a crank arm 140, and a rod 142, handle 138 being pivoted at 143 adjacent the shell and accessible from the outside of the rocket pack. In the locked position, shown in broken lines, handle 138 lies flat against the shell being retained by a spring 144, and pin 134 extends through fitting 130 in contact with a locking handle limit switch 146 to arm the rocket firing circuit. In the unlocked position shown in solid lines, handle 138 projects normal to the shell retracting pin 134 from fitting 130 and switch 146 to disarm the firing circuit which condition is indicated by the energization of a circuit position light 148. The above described electrical interlock system is provided on one of the latching mechanisms 128, the particular one being a matter of convenience to permit the disarming of the firing circuit by ground personnel for rocket loading, unloading or repairs. An exit door selector valve limit switch 150 is actuated by rod 142 when locking handle 138 is unlocked to transfer control of exit door operation to manual control switch 118 for opening the exit door from the ground. When locking handle 138 is closed, limit switch 150 shifts control of exit door movement to automatic operation.

Self-sealing, quick-disconnect couplings, not shown, are provided for the hydraulic and electrical lines, to facilitate installation and removal of the rocket pack and servicing of the system. These couplings connect the hydraulic lines from exit door selector valve 112 which can be located in the fuselage to the actuating cylinders 108 in the forward end of the rocket pack, and connect the electrical components in the cockpit to the firing circuit components in the rocket pack. Access to the couplings are through a suitable panel in the shell.

Figure 10:
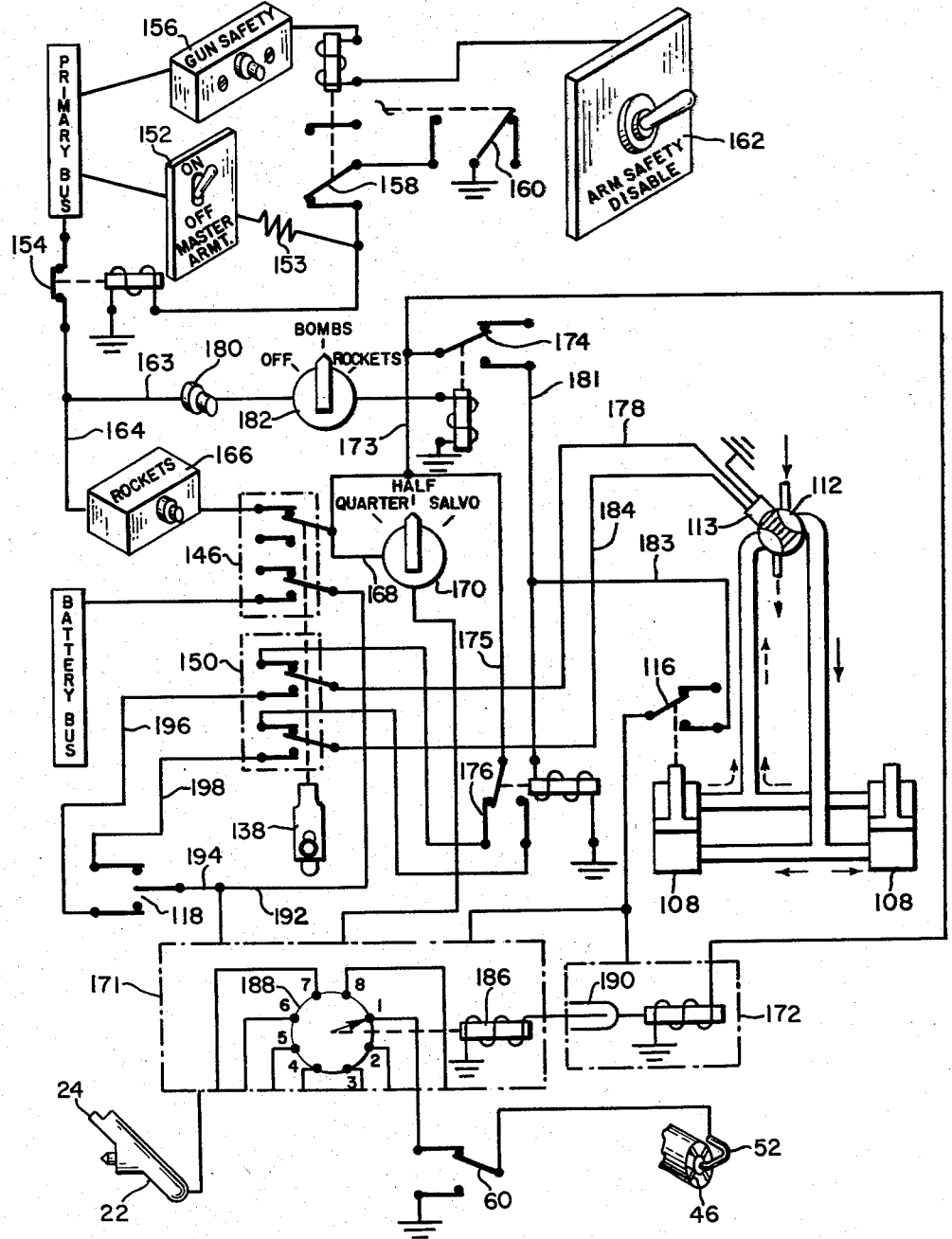
Fig. 10 is a schematic wiring diagram of the rocket firing circuit.

The rocket firing circuit is described with reference to Fig. 10 wherein the components are schematically represented in an energized condition ready for firing. Most control components may be located in an electronics compartment in the cockpit, while other components may be located in the rocket pack. The rocket firing circuits are controlled through a master armament circuit located in the cockpit and includes a master armament switch breaker (Master Armt.) 152, an armament safety resistor 153, a master armament relay 154, a gun safety circuit breaker 156 (Gun Safety), a gun firing override relay 158, a landing gear handle relay 160 and an armament safety disabling switch (Arm Safety Disable) 162. When Master Armt. switch 152 is turned to an "On" position, primary bus power source is connected to the rocket firing circuit through relay 154, providing this relay is not shorted to ground by relay 160, which occurs when the landing gear handle, not shown, is in down position. Gun Safety switch 156, relay 158 and Arm Safety switch 162 are provided for test operation of the rocket pack system on the ground.

Primary bus power connected to the firing circuit flows in two paths through lines 163 and 164. Following the circuit in line 164, power is admitted through a circuit breaker 166, for protecting the rocket circuit from overloads, to an upper pair of contacts in locking handle switch 146 (Fig. 9), shown in a locked position by locking handle 138. From switch 146 primary power is connected in line 168 to a rotary rocket quantity selector switch 170 operable by the pilot to select the quantity of rockets to be fired, namely "Quarter," "Half," and "Salvo" through firing circuits in an intervalometer 171 and impulse timer 172. The settings of selector switch 170 and the ensuing rocket firing order through the intervalometer will be hereinafter described. Primary power is also connected by line 173 to the intervalometer and a latching relay 174, the latter shown in an open position, and in line 175 to an exit door time-delay relay 176 which in a non-firing position closes exit door 104 (Figs. 2 and 3) in the forward end of shell 20 by energizing exit door selector switch 113 through line 178 and the upper pair of contacts of exit door selector valve limit switch 150, the latter also being actuated by locking handle 138.

Rockets are pilot-fired by depression of a bomb-rocket release button 180, conveniently located on the pilot's control stick handgrip, which connects power in line 163 to energize latching relay 174 when a rotary bomb-rocket selector switch 182 is in a "Rocket" position. Placing selector switch 182 in an "Off" position, opens line 163 in the firing circuit. Energization of relay 174 connects primary power in line 173 to line 181 through the lower contact of relay 174 to energize relay 176 and connecting line 175 to line 184 through the lower set of contacts in switch 150 to switch 113 and valve 112 to open exit door 104. Thus, exit door 104 automatically opens when firing button 180 is depressed and will remain open for a predetermined elapsed time controlled by relay 176. In the illustrated embodiment, it has been found that a delay of approximately 0.50 second in relay 176 after being deenergized in connecting power to close the exit door 104 will ensure that door closing will not interfere with exit of the aft rockets after firing. As previously described, exit door valve 112 is installed in the main pressure line of the utility hydraulic system and controls the position of exit door 104 by regulating fluid to the exit door actuating cylinders 108. Valve 112 is a four-way valve operated by switch 113 comprising two solenoids, one for door open and one for door close, with manual override buttons for testing.

Power in line 181 is also connected by line 183 to exit door safety switch 116 (Fig. 3) connected to impulse timer 172 and prevents firing of the rockets until the exit door is in the fully open position.

Referring back to rocket quantity selector switch 170 and intervalometer 171, the quantity of the total 32 rockets to be launched is determined by the setting of the switch in one of the three positions "Quarter" (eight rockets—two groups of four); "Half" (sixteen rockets—four groups of four; or "Salvo" (thirty-two rockets—eight groups of four). Rockets are fired as controlled by intervalometer 171 in the order shown below, the rocket tubes being numbered from left to right looking forward and are fired in the order shown to eliminate aerodynamic and fin interference.

*Rocket firing order*

| Groups in Firing Order Circuit Position | Rocket Tube Numbers | Rocket Bank |
| --- | --- | --- |
| 1 | 1, 5, 9, 13 | Forward. |
| 2 | 3, 7, 11, 15 | Do. |
| 3 | 2, 6, 10, 14 | Do. |
| 4 | 4, 8, 12, 16 | Do. |
| 5 | 1, 5, 9, 13 | Aft. |
| 6 | 3, 7, 11, 15 | Do. |
| 7 | 2, 6, 10, 14 | Do. |
| 8 | 4, 8, 12, 16 | Do. |

Intervalometer 171 is commercially available from Revere Corporation of America, Wallingford, Connecticut, and electrically selects the group of rockets to be fired by connecting power to the firing circuits, and includes a series of relays 186, one of which is illustrated, and a group selector 188, showing the eight circuit positions. The intervalometer is armed when Master Armt. switch 152 is turned to an "On" position, and actuated when release button 180 is depressed. The intervalometer is controlled by electrical impulses delivered from impulse timer 172, which consists of an electrical turning fork 190, also commercially available from the Revere Corporation of America, which steps group circuit selector 188 from one firing order circuit position to the next. The number of impulses delivered by timer 172 is determined by the position of rocket quantity selector switch 170. When group circuit selector is stepped to the last selected circuit, it transmits a signal to shut off the firing power to firing circuit selector 188, and on the next impulse it shuts off the stepping impulses from impulse timer 172. This maintains firing circuit selector 188 in position to fire the next circuit when bomb-rocket release button 180 is again depressed. The intervalometer will return to and remain in the No. 1 circuit position from any other circuit position when locking handle 138 is placed in the unlocked position for ground operation of the rocket pack system. In place of intervalometer 171 and timer 172, a simple stepping relay or a thyratron timer may be used to give impulses to the selected rockets.

The foregoing description relates to rocket pack operation during flight. Operation of the rocket pack while the aircraft is on the ground is necessary for test purposes and for loading and unloading while the landing gear handle, not shown, is in a down position the rocket system is inoperative as primary power is grounded through relay 160. To operate the rocket pack from the ground, locking handle 138 is moved to the unlocked position, except when testing continuity of the firing circuit, which mechanically actuates switches 146 and 150. Operation of limit switch 146 disconnects primary bus power and connects battery power in line 192 to the rocket firing system, disarms the firing circuits, cycles the intervalometer to the No. 1 firing position, energizes circuit position light 148 (Fig. 9), and connects power to ground-operated exit door control switch 118 in line 194. Unlocking locking handle 138 also operates exit door selector valve limit switch 150 disconnecting lines 178 and 184 from time delay relay 176 and connecting them to lines 196 and 198 to ground operated exit door control switch 118 to enable the exit door switch 113 and valve 112 to be manual controlled to open the exit door.

Operation of the entire rocket pack system is as follows assuming Master Armt. switch 152 is "On" and the landing gear handle is "Up." When rocket firing button 180 is momentarily depressed, exit door valve 112 is positioned to allow hydraulic fluid to actuate exit door cylinders 108 and open exit door 104. When exit door 104 is fully open, safety switch 116 is actuated energizing impulse timer 172 which feeds electrical impulses to the intervalometer 171 to fire the selected number of rockets as determined by the setting of selector switch 170. All forward rockets are launched before the aft rockets are energized. When a forward rocket is ignited by firing pin 28, a thrust of 215 (±35) pounds developed by the rocket will release it from latch mechanism 78. As the forward rocket leaves the tube, it trips sensing switch 60 arming the firing circuit to the aft firing pin 52. Deflector door 24 normally positioned between the fore and aft tubes 14 and 16 deflects exhaust gases and blast pressure out of shell 20. If for any reason the forward rocket misfires, sensing switch 60 maintains an open circuit to the aft firing pin, preventing the intervalometer from igniting the rocket directly behind the dud rocket. When an aft rocket is ignited and develops a thrust of 215 (±35) pounds, it trips rocket latch mechanism on tube 16 and cams open deflector door 24 which is latched in an open position to avoid interference with the passage of the aft rocket. Exhaust gases and pressure of the aft rocket are vented through an exhaust opening in the aft fairing section. After firing the selected rockets, intervalometer 171 de-energizes exit door switch 113 which closes exit door 104 and disarms the firing circuit.

Figure 12:
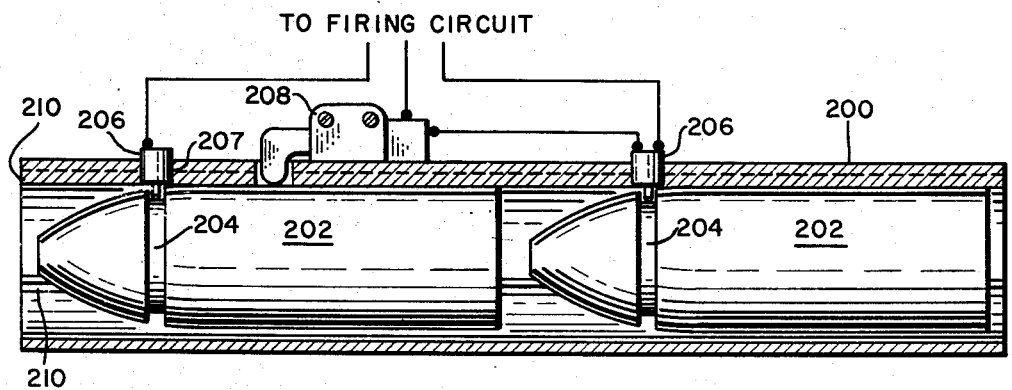
Fig. 12 is a longitudinal section of Fig. 11 taken along line XII—XII.
Figure 11:
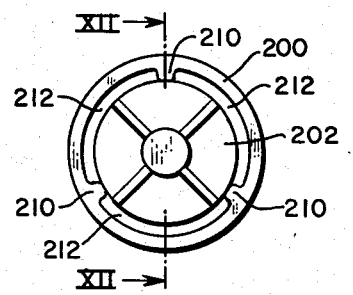
Fig. 11 is a rear view of a modified rocket tube arrangement.

In Figs. 11 and 12 are shown a modified rocket tube arrangement wherein a single open-ended tube 200 is used to house two or more rockets 202 arranged in tandem which rockets may be of a type having a primer band 204 positioned circumferentially around the rocket. In such a construction the firing mechanism 206 is located at a longitudinal position on tube 200 adjacent the rocket primer, the tube having a suitable aperture 207 through which firing mechanism is projected to ignite the primer. The firing circuit and the arrangement of the pack assembly for the embodiment of Figs. 11 and 12 may be similar to that previously described with reference to Figs. 1 through 10. A sensing switch 208 is mounted on tube 200 laterally disposed of the forward rocket to disarm the firing circuit to the aft rocket whenever the forward rocket is in the tube, similar in purpose and construction to sensing switch 60 (Figs. 3 and 6).

A plurality of longitudinal rails 210 are formed on the bore of tube 200 to support the rockets in spaced relation thereto, providing longitudinal exhaust passages 212 therebetween to vent the gases and the explosion pressures. Instead of using rails 210 and longitudinal passages 212 to vent the gases, the tube may be smooth and provided with a plurality of drilled transverse apertures, not shown, preferably between the rockets which will be able to vent the gas pressure. Means may also be provided for latching the rockets into the tube, such as retaining latch mechanism 78 (Figs. 3 and 7).

The rocket pack and firing system of this invention provides a compact grouping of rockets in stream-lined shell capable of being faired to the fuselage of an aircraft causing a minimum, if any, interference to flight characteristics. Use of a tandem arrangement of rockets permits at least twice the number of rockets to be carried in a single layer arrangement. The rockets are supported in tandem within a single tube or two or more longitudinally spaced and aligned tubes each of which constitutes a firing chamber for the respective rocket, while the forward portion or tube functions to guide the aft rocket as it passes therethrough. The firing mechanism for the single or multiple tube arrangements is located on the tubes, corresponding to the location of the rocket primer. Where the primers are located in the tail end, such as in the 2.75 inch folding fin aircraft rocket, the forward firing mechanism is conveniently located between the rockets and arranged to move out of the way of the aft fired rocket. A sensing switch associated with the forward tubes ensures that an aft tandem rocket will not fire with a rocket present in the forward tube. Latch mechanism on each tube prevents accidental displacement of the rockets until a predetermined thrust is exerted by the rockets. Various safety switches in the firing circuit ensures safe operation of all components of the system when firing in flight or when the aircraft is on the ground. The rocket pack assembly is mechanically and electrically quickly detachable from the aircraft by suitable latching mechanisms and by releasable connectors for the hydraulic fluid and electrical circuits.

Obviously many modifications and variations of the present invention are possible in the light of the above teachings. It is therefore to be understood that within the scope of the appended claims the invention may be practiced otherwise than as specifically described.

I claim:

1. A rocket launcher device comprising forward and aft longitudinally spaced rocket tubes aligned in tandem each tube capable of supporting a rocket, a firing mechanism for each rocket tube, a deflector door mounted on the launcher in the space between said tubes for blocking the aft tube and protecting the rocket in the aft tube from the blast effects of the forward rocket and deflecting the blast effects laterally through the space between said tubes, said deflector door being movable out of the space between said tubes to permit the free passage of the aft rocket through the forward tube.

2. The device of claim 1 wherein the firing mechanism for the forward tube is mounted on the deflector door.

3. An aircraft rocket-launching device comprising a shell, means for securing the shell to an aircraft, said shell housing a plurality of laterally arranged forward and aft rocket tubes longitudinally spaced in tandem, a firing circuit for successively igniting rockets adapted to be supported in said forward and aft tubes respectively, a deflector door pivotally mounted in the space between each pair of tandem tubes, a firing pin mounted on the forward face of the door for igniting the rocket in the forward tube, said door being constructed and arranged to substantially block the aft tube from the blast of the forward rocket when fired and forwardly pivotable by the passage of the aft rocket to open the aft tube and allow passage of the aft rocket through the forward tube and means for latching said door in an open position.

4. An aircraft rocket-launching device comprising a shell, means for securing the shell to an aircraft fuselage, said shell housing a plurality of laterally disposed forward and aft rocket tubes longitudinally spaced in tandem, a firing circuit for successively igniting rockets adapted to be supported in said forward and aft tubes respectively, a switch mounted on each forward tube for disarming the firing circuit to the corresponding aft tube when a rocket is present in the forward tube, releasable latch means on the tubes for holding the respective rockets in the tubes until released by a predetermined firing thrust, means for locking said forward latches in a released position after the forward rocket is fired, a deflector door pivotally mounted in the space between each pair of tandem tubes and normally in a position to block the aft tube from the blast of the forward rocket when fired, said door being pivotable to an offset position to open the aft tube to enable free passage of the aft rocket through the forward tube.

5. An aircraft rocket launching device comprising a shell, means for detachably securing the shell to an aircraft fuselage, said shell housing a plurality of laterally disposed forward and aft rocket tubes longitudinally spaced in tandem, a firing circuit for successively igniting rockets adapted to be supported in said forward and aft tubes respectively, a deflector door pivotally mounted in the space between each pair of tandem tubes and normally in a position to block the aft tube from the blast of the forward rocket when fired, said door being pivotable to an offset position by firing of an aft rocket to enable free passage of the aft rocket through the forward tube, a firing pin mechanism for the forward tube mounted on the deflector door, a switch mounted on each forward tube for disarming the firing circuit to the corresponding aft tube when a rocket is present in the forward tube, a releasable latch means on each tube for holding the respective rockets in the tube until released by a predetermined firing thrust, said shell having an exit opening aligned with the tubes through which the rockets are discharged, a door for closing said opening, means for opening the door, and a switch operable by the door opening means to disarm the firing circuit when the door is closed.

6. A rocket launcher device comprising a rocket tube arrangement providing a firing chamber for a plurality of longitudinally spaced rockets snugly supported in firing position in tandem one behind the other, a plurality of firing mechanisms mounted on said tube arrangement, one for each of said rockets, said firing mechanism for the forward rocket extending into the bore of the tube arrangement for igniting the respective rocket and being retractable from the firing position to a retracted position completely outside the tube bore to permit the free passage of an aft rocket.

7. The rocket launcher of claim 6 wherein each rocket is mounted in a separate tube longitudinally spaced in tandem, and said firing mechanism for the forward tube is movable in said space between the tubes.

8. An aircraft rocket-launching device comprising a shell, means for securing the shell to an aircraft, said shell housing a plurality of laterally arranged forward and aft rocket tubes longitudinally aligned and spaced in tandem, a firing circuit including a firing mechanism for each tube for successively igniting rockets adapted to be supported in said forward and aft tube respectively whereby each aft rocket can be propelled through said aligned forward tube after ignition of the forward rocket, an interlock switch mounted on each of the forward tubes for opening the firing circuit to the respective aft tubes whenever a rocket is present in the forward tube, said switch being tripped by the movement of the forward rocket to close the firing circuit to the aft rocket, a deflector door pivotally mounted between each pair of tandem tubes, said deflector door being constructed and arranged substantially to block the respective aft tube from the blast of the forward rocket and pivotable to open the aft tube and allow free passage of the aft fired rocket through the forward tube.

References Cited in the file of this patent

UNITED STATES PATENTS

| | | |
|---|---|---|
| 2,313,030 | Tauschek | Mar. 2, 1943 |
| 2,398,871 | Turnbull et al. | Apr. 23, 1946 |
| 2,409,210 | Jolly | Oct. 16, 1946 |
| 2,421,893 | Lambert et al. | June 10, 1947 |
| 2,445,235 | Myers | July 13, 1948 |
| 2,451,522 | Uhl et al. | Oct. 19, 1948 |
| 2,478,774 | Meinel | Aug. 9, 1949 |
| 2,496,316 | Skinner et al. | Feb. 7, 1950 |
| 2,517,333 | Motley | Aug. 1, 1950 |
| 2,546,823 | Holloway | Mar. 27, 1951 |
| 2,609,730 | Bergstrom | Sept. 9, 1952 |
| 2,690,124 | Melick | Sept. 28, 1954 |
| 2,696,143 | Cross | Dec. 7, 1954 |
| 2,780,143 | Graham | Feb. 5, 1957 |

FOREIGN PATENTS

| | | |
|---|---|---|
| 914,341 | France | June 17, 1946 |